Figure 1:
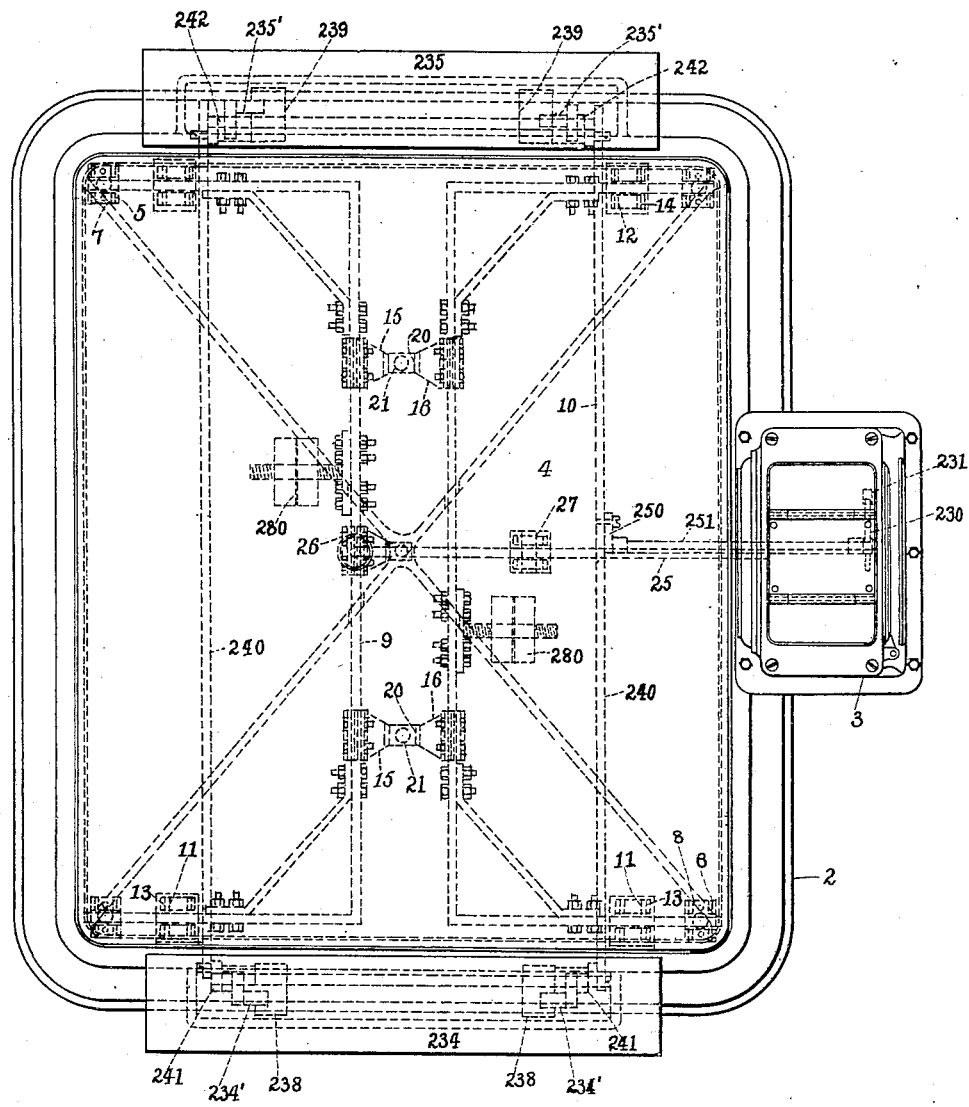

No. 763,143. PATENTED JUNE 21, 1904.
F. A. BOLAND.
AUTOMATIC WEIGHING MACHINE.
APPLICATION FILED AUG. 25, 1903.
NO MODEL. 7 SHEETS—SHEET 1.

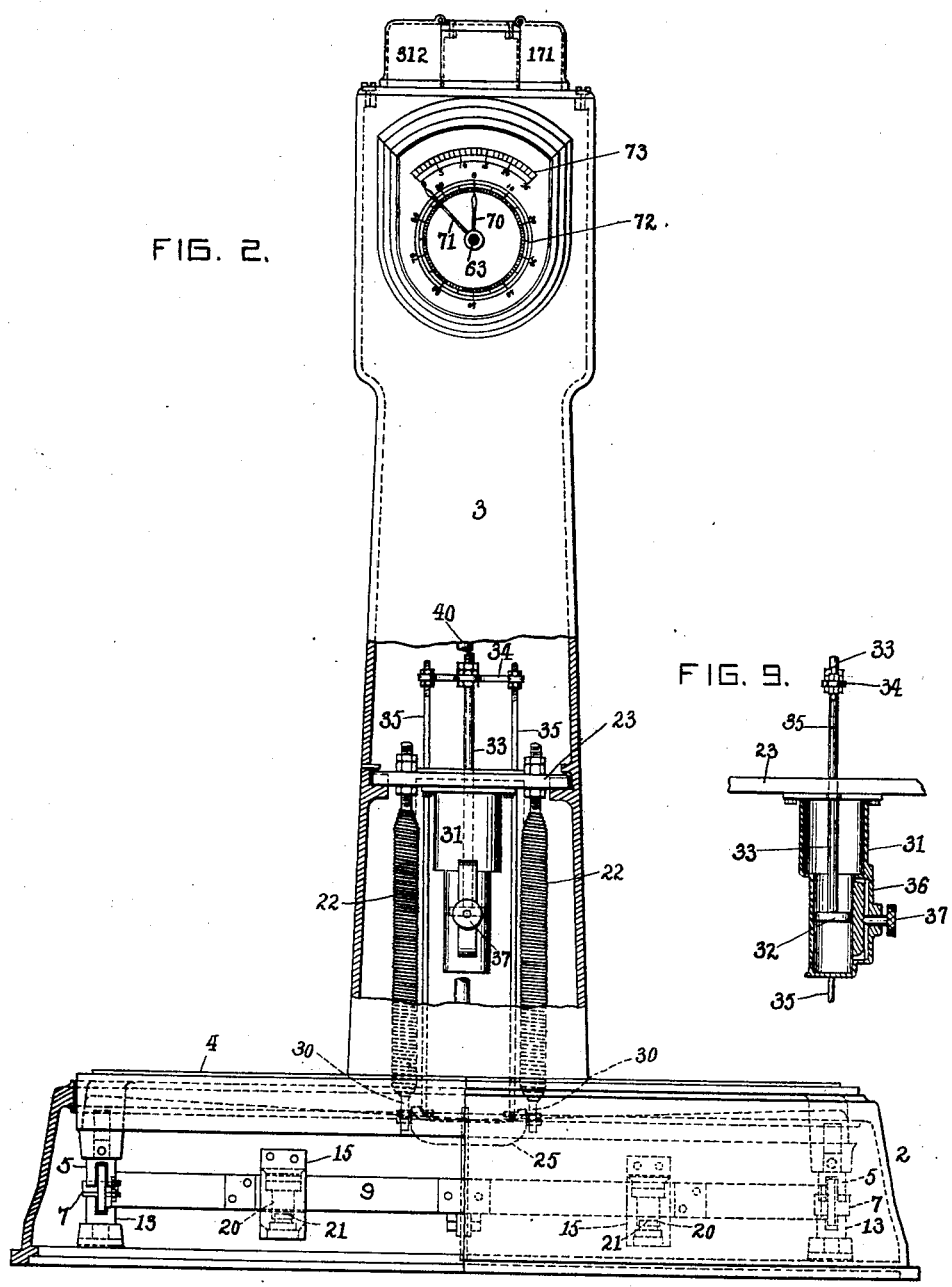

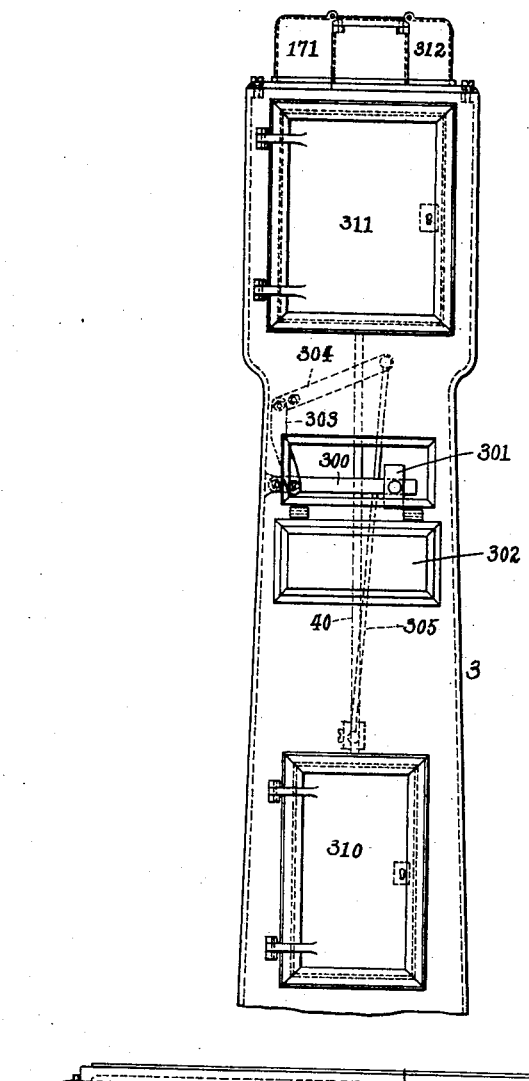
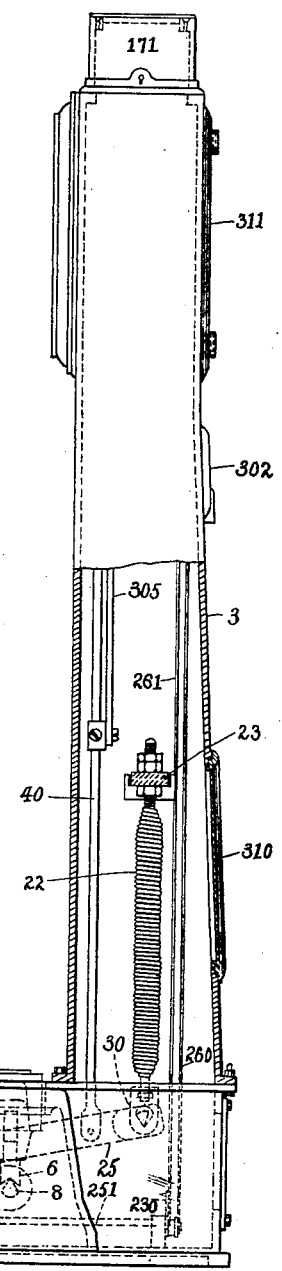
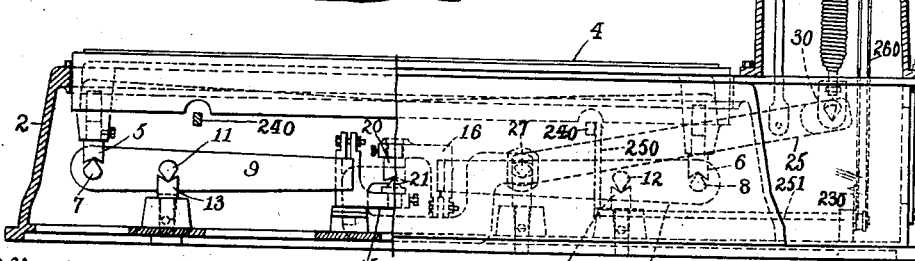

No. 763,143. PATENTED JUNE 21, 1904.
F. A. BOLAND.
AUTOMATIC WEIGHING MACHINE.
APPLICATION FILED AUG. 25, 1903.
NO MODEL. 7 SHEETS—SHEET 4.

Witnesses
R. Champion
J. T. Jones

Inventor
Frederick A. Boland
By his Attorney

No. 763,143. PATENTED JUNE 21, 1904.
F. A. BOLAND.
AUTOMATIC WEIGHING MACHINE.
APPLICATION FILED AUG. 25, 1903.
NO MODEL. 7 SHEETS—SHEET 5.

Witnesses
Inventor
Frederick A. Boland
By his Attorney

No. 763,143. PATENTED JUNE 21, 1904.
F. A. BOLAND.
AUTOMATIC WEIGHING MACHINE.
APPLICATION FILED AUG. 25, 1903.
NO MODEL. 7 SHEETS—SHEET 6.

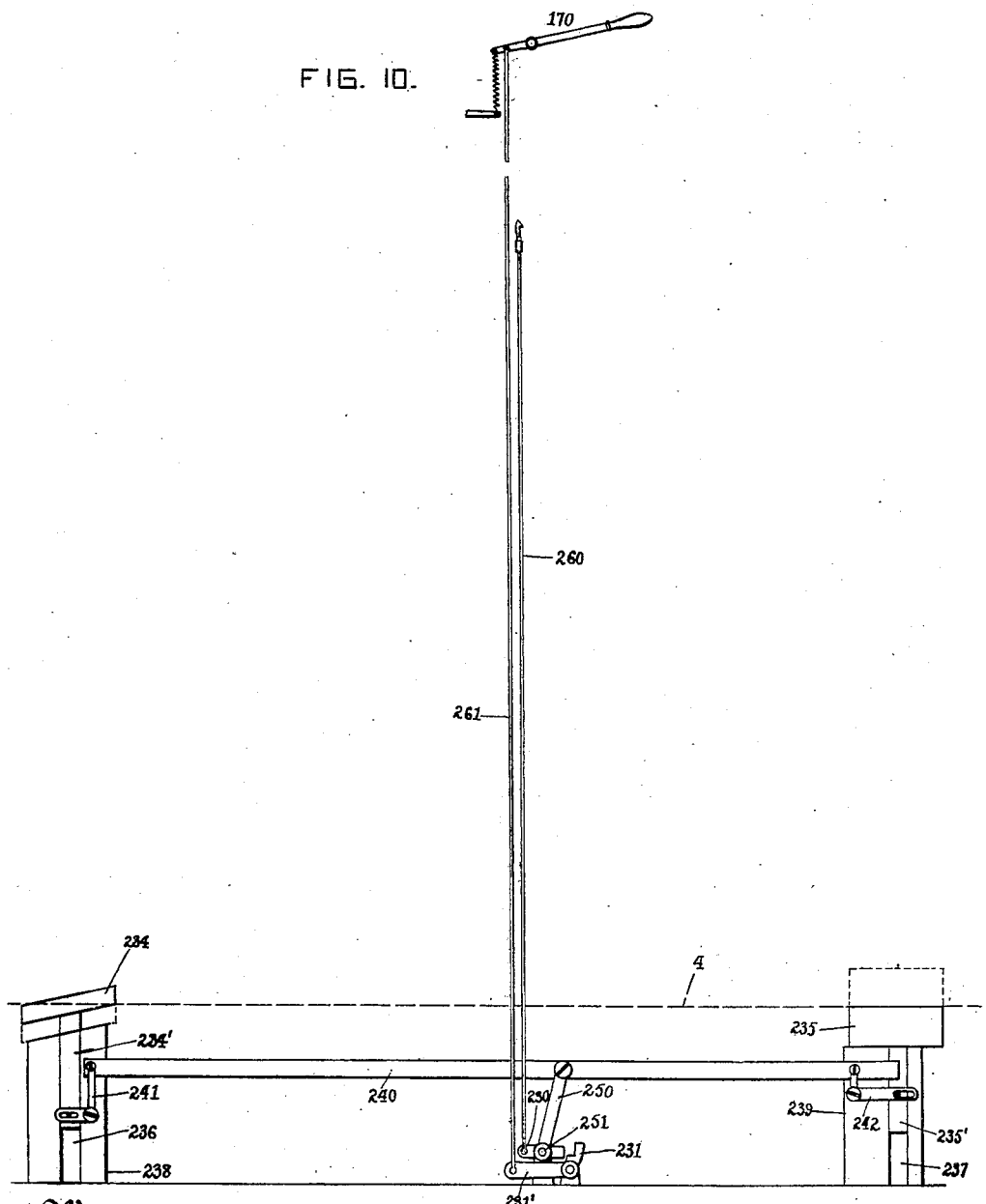

No. 763,143.                                                    Patented June 21, 1904.

UNITED STATES PATENT OFFICE.

FREDERICK A. BOLAND, OF BROOKLYN, NEW YORK, ASSIGNOR OF THREE-FOURTHS TO ALPHONSO D. CURTIS, OF BROOKLYN, NEW YORK.

AUTOMATIC WEIGHING-MACHINE.

SPECIFICATION forming part of Letters Patent No. 763,143, dated June 21, 1904.

Application filed August 25, 1903. Serial No. 170,709. (No model.)

*To all whom it may concern:*

Be it known that I, FREDERICK A. BOLAND, a citizen of the United States, and a resident of Brooklyn, in the county of Kings and State of New York, have invented certain new and useful Improvements in Automatic Weighing-Machines, of which the following is a specification.

This invention relates particularly to automatic weighing-machines for weighing successive loads; and the principal object of the invention is to provide a new type of automatic weighing-machine by means of which the weights of varying loads may be automatically and accurately determined.

In automatic weighing-machines as ordinarily constructed the mechanism is either of that type having a platform and a normally locked indicating mechanism releasable by a coin and adapted to indicate the weight of an individual or an article on the platform or else of that type in which the mechanism is adapted for automatically weighing successive predetermined or like charges or loads.
The weighing-machine constituting the subject-matter of my invention is distinguished from both of these types of automatic weighing-machines—from the former because it is adapted and intended to register and record the weight of each load and preferably the sum also of all loads weighed by the machine and from the latter because it is especially adapted and intended to determine automatically the weights of successive loads of varying sizes and weights. As compared with the type of automatic weighing-machines in which a predetermined weight of material is received at each operation of the machine, it will be seen that the principal distinguishing feature of my present invention is the determination of the weights of indeterminate loads delivered to the machine in varying quantities, this machine therefore being adapted to determine how much any load, great or small, delivered thereto weighs, while said other type of weighing-machine is especially designed to prevent the delivery to the weighing mechanism of any load in excess of a predetermined weight representing the only load adapted to be properly weighed by such machine.

In order that an automatic weighing-machine of this type may operate properly, it is necessary to provide a weighing mechanism embodying a load-receiver movable different distances corresponding to the different loads weighed, whereas in the type of automatic weighing - machines which receive and deliver a load of predetermined weight the extent of the movement of the load-receiver is a factor that need not be regarded, the weight of the load being always a constant. In the weighing - machine for weighing predetermined or constant loads registration of the loads weighed is effected by merely counting the number of such loads, whereas in an automatic weighing-machine operated on the principle just stated it is necessary to provide a registering mechanism having varying registering movements corresponding to the varying movements of the load-receiver—that is to say, the registering mechanism must have a movement corresponding to the weight of the load weighed by the machine, and one of the most important features of my invention is the provision of registering mechanism, preferably a recorder, controlled by the weighing mechanism and operative for registering or recording the exact amount of each one of a series of varying loads.

Another important feature of my invention is a registering adding mechanism, preferably a recording adding mechanism, by means of which the exact amount of each one of a series of varying loads is registered or recorded and also the totals or sum of all such loads. This mechanism may be of any suitable type capable of moving different distances for registering or recording the individual loads and of adding the movements representing the individual registrations and registering or recording the sum of all such movements; but I prefer to employ a registering mechanism or registering adding mechanism in which each wheel of the registering-train has thereon registering or recording figures of different denominations and is capable of registering or recording a relatively great weight as compared with registering devices of the ordinary type in which the registering or recording numbers on each wheel run from "0" to "9," inclusive. By employing adding-wheels having numbers of different denominations thereon the number of wheels in the registering-train or recording-train may be greatly reduced, the construction simplified, and the operation thereof facilitated. I apply this principle of construction and operation both to the individual set of the registering or recording mechanism and to the adding set thereof and am thereby enabled to weigh a long series of loads each of great weight and to add the sum of these weights by means of a simple register or recorder having the minimum number of wheels. The individual set of such a register or recorder is so constructed as to be movable in both directions with the load-receiver in order that the individual set may have a registering movement corresponding to the movement of the load-receiver and may then return to its zero position. The adding set, however, is so constructed as to be movable in one direction only—that is to say, in the direction of registration—and is held against movement during the return of the individual set to its normal or zero position. Suitable controlling means is employed for operating both sets of the register or recorder in unison and for also holding the adding set during the return of the individual set to zero.

One of the principal features of my improved registering or recording mechanism is a feed-controller which is preferably in the form of a feed-cam and has feed-indications the values of which correspond to the movements of such feed-controller or feed-cam and govern the registering or recording operation. This feed-cam has a stepped cam-face the steps of which represent different feeds, and hence represent loads of different weights. This feed-cam is preferably rotary and controls the variable rotary movements of the wheel or wheels of the individual registering set of the registering mechanism. Through the different feed-indications of this feed-cam the various rotary movements of the feed controller or cam may be transmitted to the registering or recording mechanism proper, a feed-transmitter being employed by me which is normally out of operative relation with the feed controller or cam and is brought into operative relation therewith at the proper time for registering or recording the weight of the load.

An important feature of my invention is the provision of means for guarding the machine against improper operation, particularly by unauthorized persons, and it is important to provide suitable means for locking the registering or recording mechanism and for releasing the same at the proper time. In the preferred construction the whole registering mechanism—that is to say, the individual and adding sets of the register or recorder—will be guarded against improper operation, the means for locking and releasing these parts being preferably mounted in a normally locked casing a key or keys to which will be held by one or more persons, or which may be released in any other desired manner. Where recording-wheels are used, suitable means for producing an impression of the types on said wheels will be employed and also paper-feeding mechanism, which with such other devices as may be associated therewith—such, for example, as an inking device or ribbon—may all be under the control of such locking and releasing means.

An automatic weighing-machine of this type may be used to great advantage for weighing heavy loads varying widely, such as trucks loaded with packages or otherwise. These trucks may be driven onto and off from the load-receiving platform of an automatic weighing-machine embodying my invention, and suitable controlling devices may be operated by the driving on and driving off of such trucks or other vehicles. The driving on of the load is preferably utilized to operate a locking device which locks the load in place until the weighing operation is completed. When used to weigh truck-loads of material, the machine will be provided with a platform approximately flush with a driveway, and the truck will be driven onto the platform at one side of the machine and will be driven off at the other side, and the controlling means will be so constructed and operated as to prevent the registering of a load unless the vehicle is properly driven onto and off from such platform. I prefer to make use of a pair of controlling devices, one of which is operated directly by the vehicle and both of which are controlled by a locking device or locking devices governed by the same locking and releasing means hereinbefore described as controlling the operation of the registering or recording wheels. When the parts are so constructed and organized, the entire mechanism will be guarded against improper operation and a locking device will be maintained in the path of the load or vehicle on the load-receiver or platform until the registering-wheels register the weight of the load and permit the release of said locking device.

In weighing loads in the manner just described—that is, in weighing loads carried in vehicles or trucks which are driven onto and off from a load-receiving platform—it is necessary to deduct from the gross weight of the vehicle and its contents the weight of the vehicle itself in order to determine the net weight—that is, the actual weight of the load on the vehicle. In an automatic weighing-machine of this type I also prefer to provide means for automatically making this deduction—that is, for automatically deducting from the gross weight of the load weighed the weight of the vehicle containing such load regardless of the nature or structure of such vehicle. This can be best accomplished by loading the material to be weighed into vehicles of uniform weight and by providing in the machine an automatic counterbalance exactly equal to the weight of such vehicle. This automatic counterbalance should work in opposition to the main weighing mechanism in order that the weight thereof may be deducted from the total load weighed by the machine. This counterbalance constitutes a tare device or tare-counterbalance, and its counterbalancing effect will be transmitted to the prime mover of the registering mechanism, and the weight of the vehicle containing the load will thus be automatically deducted from the total load weighed and only the net weight of the load will be registered or recorded by the individual and adding sets of the registering or recording train. This tare-counterbalance may be of any suitable type and may be placed at any desired point in the machine for coöperation with the main weighing mechanism; but it will preferably be embodied in an auxiliary weighing device or scale-beam so connected with the prime mover of the registering-train as to oppose the force exerted on such prime mover for imparting thereto a registering movement.

Other features of my invention not hereinbefore described will be hereinafter referred to and are illustrated in the accompanying drawings, in which—

Figure 5:
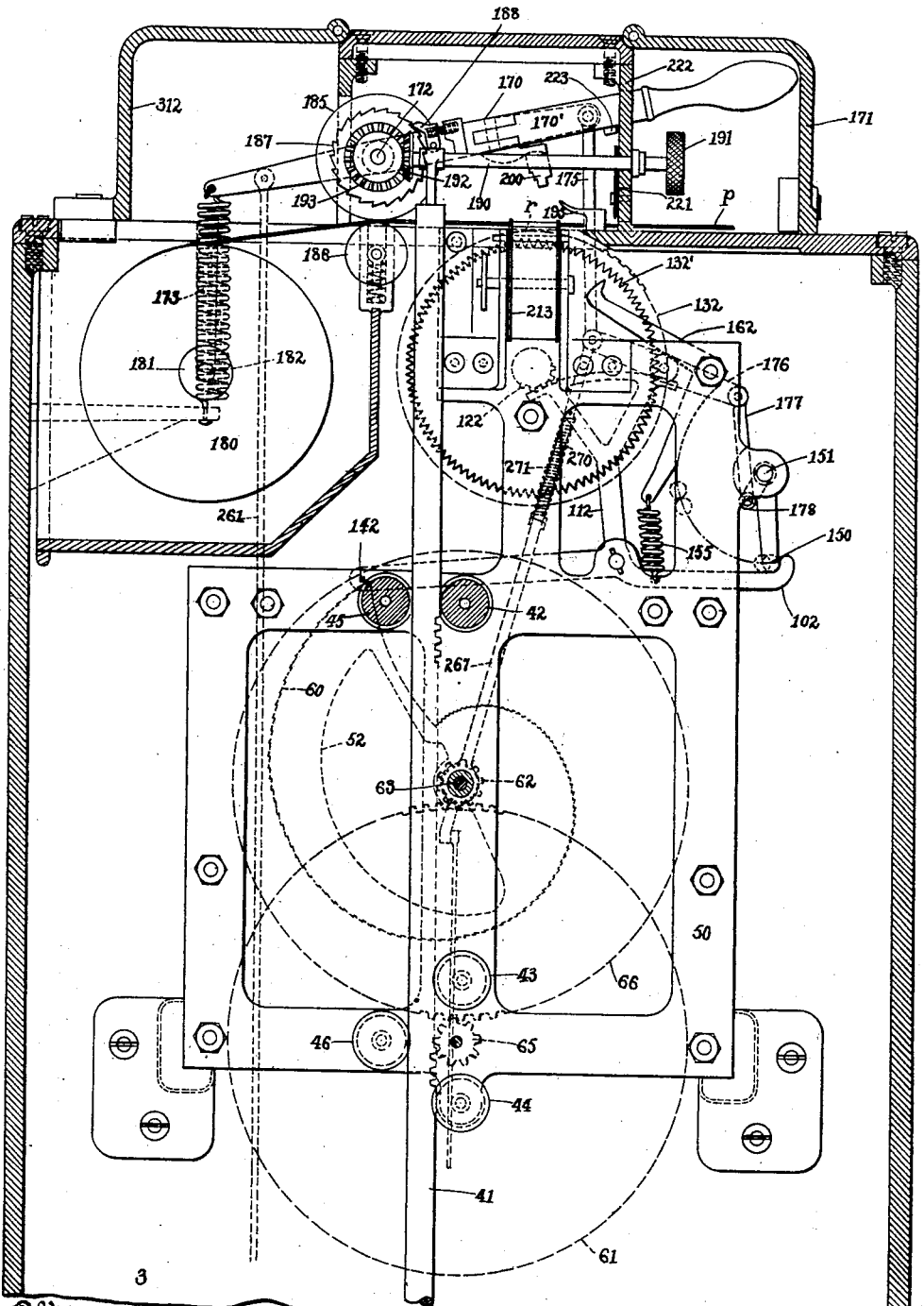
Figure 6:
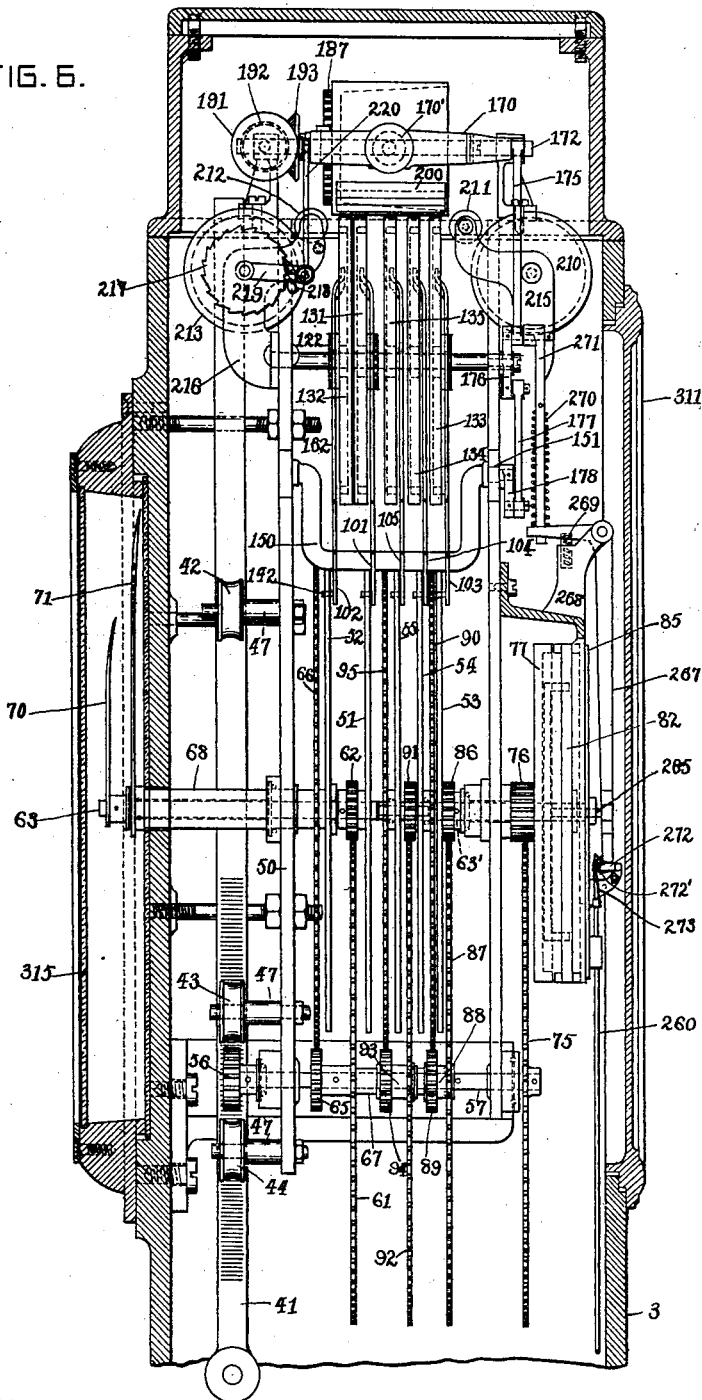
Figure 7:
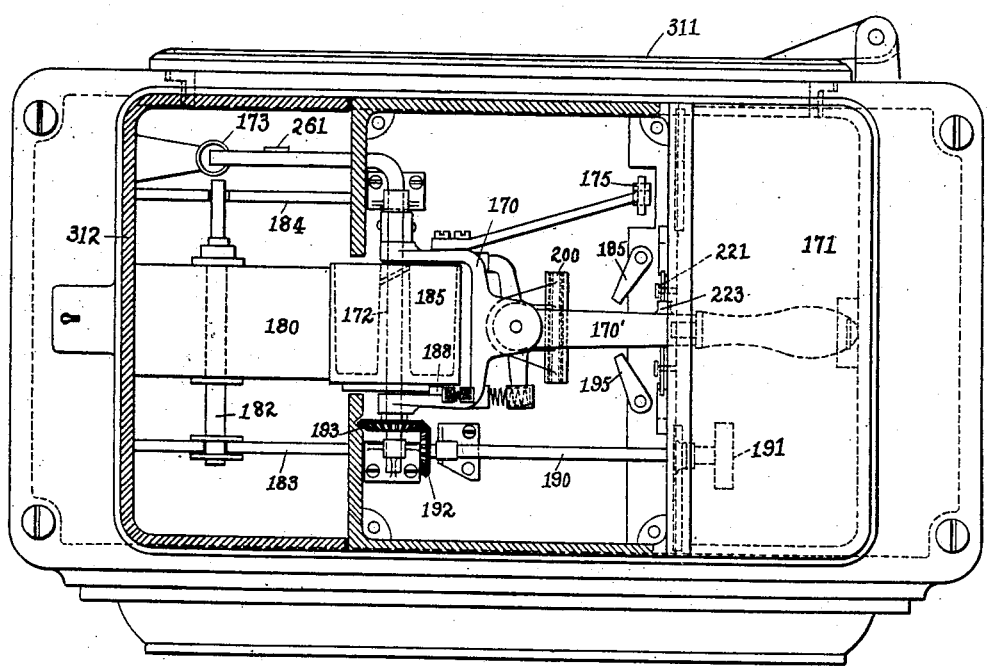
Figure 8:
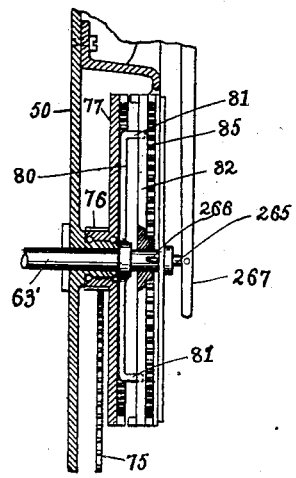

Figure 1 is a plan of an automatic weighing-machine adapted for weighing loads of different weights. Fig. 2 is a sectional front elevation of the same with parts removed. Fig. 3 is a sectional end elevation of the same as viewed from the right in Fig. 2. Fig. 4 is a rear elevation of the upper portion of the machine. Fig. 5 is an enlarged vertical longitudinal section of the registering mechanism and associated devices. Fig. 6 is an enlarged vertical transverse section of the same. Fig. 7 is an enlarged horizontal sectional plan of the same. Fig. 8 is a sectional detail of the coupling means for controlling the movements of the adding set of the registering-train. Fig. 9 is a sectional detail of a governor for controlling the reaction of the weighing mechanism. Fig. 10 is a detail illustrating the devices for locking a vehicle in position on the platform of the machine and controlling the exit of the vehicle therefrom, the angular position of the controlling-lever and its connected parts in this view being ninety degrees from the normal in order to illustrate clearly the manner in which it coacts with the other parts shown in said view.

Similar characters designate like parts in all the figures of the drawings.

Referring first to Figs. 1, 2, and 3, I have illustrated in these views the ordinary type of platform-scale suitably modified to adapt it for use as an automatic machine for weighing loads of different weights. The framework in this construction consists, essentially, of a heavy base or bed, which is designated generally by 2, and a heavy column similarly designated by 3. These parts are so constructed and connected as to constitute a closed casing at all points for protecting the weighing and controlling mechanisms from being tampered with for the purpose of varying the operation of the machine. The base 2 is substantially rectangular in this construction and has a substantially rectangular opening in which works a corresponding platform 4, which may be substantially of the usual type of scale-platforms suitably strengthened by flanges and braces, as may be required. This load-receiver or load-receiving platform constitutes one of the principal elements of the weighing mechanism and is preferably provided with V-shaped bearings 5 and 6 of the usual type. These are mounted on knife-edged bearings 7 and 8, carried by scale-beams, such as 9 and 10, also having knife-edged bearings, such as 11 and 12, mounted on V-shaped bearings, such as 13 and 14, all of these parts being of well-known construction. The scale-beams 9 and 10 are preferably formed as rectangular frames, as clearly shown in Fig. 1, suitably braced at their adjacent corners, and these frames are suitably connected for movement in unison, as by means of complementary brackets, such as 15 and 16, secured, respectively, to the inner sides of the frames of the scale-beams 9 and 10 and having coacting V-shaped bearings and knife-edged pivots (designated by 20 and 21, respectively) at their points of connection. To the counterpoising side of the weighing mechanism— that is, to the inner sides of the frames of the scale-beams 9 and 10—a lever-arm may be connected for the purpose of transmitting the thrust of the load on the platform 4 to the registering or recording mechanism for the purpose of registering or recording the weight of the load on the platform. This platform is movable different distances vertically, which distances correspond to the weights of the loads supported thereby, a relatively short vertical movement of the load receiver or platform being sufficient for determining the weight of a load of large size. For the purpose of counterbalancing or counterpoising the weight of a load carried by the load-receiver I prefer to made use of a strong spring or springs, such as those shown at 22, which are secured at their upper ends to a suitable fixed member, such as a strong cross-bar 23, fastened in the hollow column 3, the lower ends of these springs being coupled to the rear end of the scale-lever or lever-arm 25, by means of which the movements of the scale-beams proper are transmitted to the registering mechanism. The lever 25 is preferably connected to the scale-beam 9 at the center line of the counterpoising side of the weighing mechanism proper, said lever being preferably bent downwardly and rearwardly and then upwardly and forwardly at its short end to form a hooked portion having a V-shaped bearing or hanger in line with and similar to that shown at 20 in Fig. 3, which rests on a corresponding knife-edged bearing in line with and similar to the bearing 21 in said figure and supported by a bracket 26, similar to the brackets 15. This long-armed lever 25 is pivoted at 27, V-shaped bearings and knife-edged pivots being employed for this purpose, and at its rear end is forked, as shown clearly in Fig. 2, and is connected by connecting-buckles, such as 30, with the springs 22, the forked portions of said lever 25 and the connecting-buckles 33, having coacting knife-edged pivots and V-shaped bearings. The parts just described obviously constitute a means for counterpoising or counterbalancing any load within the limits of the springs 22 and for transmitting to suitable registering mechanism load-registering movements corresponding to the weights of the loads.

For the purpose of reducing the strains on the moving parts of the weighing mechanism and regulating the reactions thereof, especially when the load is removed from the receiver or platform 4, I prefer to make use of a suitable governor or controller for opposing or balancing such movements, particularly the return movements of the counterpoising springs 22, and thereby reducing the strains on said springs. Any suitable type of governor may be employed for this purpose, that shown herein comprising a cylinder, such as 31, of two diameters, in the smaller diameter of which a piston 32 works and has a loose fit for the purpose of permitting fluid, such as oil, to pass freely though somewhat slowly around the piston from one end of the cylinder to the other. This piston has a suitable piston-rod 33 connected thereto and working in a guide-opening in the cross-bar 23, said piston-rod being connected at its upper end to the center of the cross-head 34 and held in place by suitable adjusting and check nuts. To the ends of this cross-head are connected the upper ends of a pair of connecting-rods 35, the lower ends of which are pivoted to the inner sides of the forks of the forked lever 25 of the weighing mechanism proper, as clearly shown in Figs. 2 and 3. At one side thereof the governor has a passage 36, which communicates with the cylinder-space at opposite sides of the piston 32, the flow of fluid or liquid through the passage 36 being controlled by a valve, such as a needle-valve 37. By means of the loose fit of the piston 32 in the cylinder 31 and the valve 37 the rapidity of movement of the piston in the cylinder may be regulated within wide limits. This device obviously constitutes a means for checking and regulating the return movements of the scale-beams, &c., and of the springs 22 by opposing a regulating fluid resistance to such return movements. It also serves to retard to the proper extent the descent of the load-receiver and the expansion of the springs 22 when a heavy load is suddenly delivered to the weighing mechanism. Thus both the descending and the ascending movements of the load-receiver and its counterpoising springs are regulated at all times by the action of this governor.

The movements of the load-receiver may be transmitted to a suitable registering or recording mechanism in any proper manner, the transmitting device in the construction shown being a connecting-rod 40, pivoted at its lower end to the lever-arm 25 at a point near the rear end of said lever-arm, the upper end of the connecting-rod 40 being connected in turn directly to the primary actuator of the registering mechanism. In this case this primary actuator is a rack 41, pivoted to the upper end of the connecting-rod and mounted for vertical reciprocation in the hollow column 3 at the upper end thereof. This rack is preferably held in place and guided in its movements by guide-rolls located at different points in the length of the rack, five such rolls being shown herein, (designated, respectively, by 42, 43, 44, 45, and 46,) three of them being disposed at the front of the rack and two at the back thereof. All of said rolls are journaled on studs, such as 47, secured to suitable framework fastened to the inner walls of the upper end of the hollow column 3, this frame being designated generally by 50 and being analogous in construction to a clock-frame.

The rack 41 is intended to control directly the movements of the elements of the individual set of the registering or recording mechanism, these elements being preferably rotary ones. One of the principal elements of the individual set is a feed-controller in the form of a feed-cam, and an additional feed-controller or feed-cam similar in all respects to the first one may be employed for each of the other elements or wheels of the individual and adding sets. This feed-cam, as shown herein, has a plurality of feed indications or feed-indicating members of different values, preferably arranged in a circuit, there being one hundred different feed indications in this feed-cam, preferably formed as steps of equal height, but gradually decreasing in length as they approach the center of rotation of the cam. Each of these cams constitutes an index device, and the five cams shown are designated, respectively, by 51, 52, 53, 54, and 55. The feed indications or steps of the cam-face are designated by 60, the first one of the series at the top of the cam representing the zero position and the others indicating in this case weights ranging from one to ninety-nine pounds, inclusive, instead of one to nine pounds, as in index-wheels of registering mechanisms of the ordinary type. The first feed-cam of the set—viz., the cam 51—is geared to the rack 41, so as to move freely in both directions, according as the rack is drawn down by a load placed on the platform 4 or is permitted to rise on the removal of such load. In the construction shown a pinion 56 is pinned to a driving-shaft 57, mounted in suitable bearings in the frame 50, the movements of the rack and said pinion being so proportioned in this construction that the pinion will have a maximum movement of two and one-half rotations corresponding to the extreme movement of the rack. This maximum movement of the pinion 56 represents in this case a load of two thousand five hundred pounds on the frame 4, although the capacity of the machine may be varied at will. The movements of the pinion 57 will preferably be transmitted to the first feed-cam 51 by multiplying-gearing having a ratio one to ten, so that said feed-cam 51 will have a maximum movement of twenty-five rotations while the pinion 56 is rotating two and one-half times. The gearing shown for connecting the pinion 56 and the first feed-cam or index-cam 51 comprises a large spur-gear 61, pinned to the shaft 57, and a pinion 62, pinned to the shaft 63, which constitutes the main shaft of the indicating devices of the registering mechanism. Two pairs of gearing are sufficient for the purpose of transmitting the movements of the weighing mechanism to the individual set of the register or recorder, the other set of gears being in this case a pinion 65, secured to the same hub 67 as the large gear 61 and meshing with a spur-gear 66, the pinion and gear 65 and 66 being in this case similar to the pinion and gear 62 and 61, but arranged in the opposite manner, so that the ratio of the pinion to the gear will be as ten to one, and the gear will therefore be capable of making only one-fourth of a complete rotation. The gear 66 is not pinned to the shaft 63, but instead is secured to a hollow spindle or sleeve 68, mounted on the shaft 63, the shaft 63 and the sleeve 68 preferably having at the front of the machine index-hands, such as 70 and 71, which may coact with suitable scales or indications, such as 72 and 73, (see Fig. 2,) from the former of which may be read the number of pounds less than one hundred and from the latter of which it may be determined how many hundreds of pounds there are in the load weighed. The indicator or scale 72 is a circular one, while that shown at 73 is a quadrant to conform to the movements of their controlling-gears, which gears 62 and 66 are capable, as just stated, of making twenty-five rotations and one-fourth of a rotation, respectively. The second feed-cam or index-cam 52 is secured to the sleeve 68 and, as will be obvious, also makes not more than one-fourth of a complete turn each time a load is weighed. It will be noticed that all of the gears and pinions of the individual set just described, together with the two feed-cams controlled thereby, are pinned to spindles or shafts which are coupled to the rack 41 at all times by direct gearing and that all said parts will therefore rotate whenever the rack is moved, the direction of rotation depending on whether the rack is drawn down or is permitted to rise after a load is weighed. All of these parts should therefore be free to move when the rack is moved—that is to say, the rotary elements of the individual set which have been described should have an indexing movement to indicate the weight of the load when the rack 41 is drawn down and should also have a return movement to the zero position when said rack returns to its normal position.

In connection with the gearing just described for the individual set of the registering or recording mechanism I prefer to employ similar devices for adding the successive weight-registering movements of the individual set. In order to accomplish this, it is necessary to mount the elements of the adding set in such a manner that their movements will be controlled only by the descending movements of the rack 41 and so that they will be held from movement when the rack and the elements of the individual set are returning to their normal positions. For this reason the adding set is preferably coupled to the individual set during the registering of the load, but is uncoupled therefrom and the elements of the individual set permitted to rotate relatively to those of the adding set while said elements of the individual set are returning to zero. In this construction (see Fig. 6) the primary shaft 57 has secured to the rear end thereof a spur-gear 75, which meshes with a pinion 76, mounted for rotation in this case about the same axis as the gears and feed-cams which are movable about the shaft 63. The pinion 76 is secured to a clutch member, which is preferably a crown-gear 77 having one hundred teeth, and through the gear and pinion 75 and 76 this coupling-gear will be rotated in one direction or the other, according as the members of the individual set rotate to indicate the weight of the load or to return to their normal positions. The movement of the coupling-gear 77 will be exactly the same as that of the feed-cam 51—that is, it will have a maximum movement of twenty-five rotations in each direction. A shaft 63' in the construction shown constitutes substantially a continuation of the shaft 63, but is movable independently thereof, the two being preferably journaled on each other at their adjacent ends, as shown. On this shaft there is loosely mounted in the present case a cross-piece 80, (see Figs. 6 and 8,) having coupling-pins 81 projecting therefrom into openings in a coupling element splined to the shaft 63', so as to rotate always in unison therewith, but capable of reciprocation axially thereon. The coupling-pins are in constant engagement with the coupling element 82 in all positions of the latter, and said coupling element is shiftable on the shaft 63' and the pins 81 into engagement with the teeth of the rotary crown-gear 77 or into engagement with the teeth of a fixed crown-gear 85, similar to the gear 77, but secured to the framework, according as it is desired to rotate or to hold the adding set. The coupling element 82 will be shifted to the left to couple the individual and adding sets at the beginning of the registering movement of the individual set and will be shifted to the right and held against movement by the fixed gear 85 before the return movement of the individual set to zero begins. The means for controlling these coupling movements may be of any suitable type and not being essential to the operation of the adding set will be described hereinafter in connection with the controlling devices for guarding the register or recorder against improper operation.

The shaft 63' has pinned thereto a pinion 86, similar to the pinion 76, and when the shaft 63' is coupled to the gear 77 and the pinion 76 by means of the intermediate coupling element 82 said gear 86 will have exactly the same movements as the pinions 76 and 62, and hence the two shafts 63 and 63' will at such times rotate in unison. When, however, the parts are in the position shown in Fig. 6, with the adding set uncoupled from the coupling-gear 77 and locked to the fixed gear 85, the pinion 86 and the other members of the adding set controlled thereby will remain stationary. The pinion 86 constitutes the primary element of the gear-train of the adding set. In this construction it meshes with a spur-gear 87, which is secured to a sleeve 88, loosely mounted on the shaft 57, the pinion 86 and gear 87 having the same ratio as the pinion and gear 62 and 61 of the individual set. A pinion 89 is also secured to the hub 88 and is similar to the pinion 65. It meshes with a spur-gear 90, similar to the spur-gear 66, the gear 90 being loosely mounted on the shaft 63'. To the hub of the gear 90 is secured for rotation in unison therewith a pinion 91, similar to the pinion 86, and it meshes with a spur-gear 92, similar to the gear 87, secured to the hub 93, also loosely mounted on the shaft 57. The hub 93 has a pinion 94 secured thereto for rotation in unison with the gear 92, and this pinion drives another gear 95, which is similar to the gear 90 and constitutes the last gear of the adding gear-train. This gear 95 is also loosely mounted on the shaft 63' and has a hub separated from the hubs of the other gears on said shaft. The pinion 86 is in fixed relation with the first feed-cam or index-cam 53 of the adding set, the gear 90 and the pinion 91 are in fixed relation with the second feed-cam 54 of said adding set, and the last gear 95 of the train is in fixed relation with the third feed-cam 55 of said adding set. The movements of these gears and feed-cams are so proportioned that the first feed-cam 53 registers in this case weights up to (but not including) one hundred pounds, while the third feed-cam registers weights up to one million pounds. The shaft 63' and the pinion 86, together with all the other elements of the gear-train of the adding set, will rotate in unison with the gears of the individual set to add the weights of successive loads; but all of these elements of the adding set will be held stationary while the gears of the individual set are returning to their normal positions. In order to enable the gears and pinions of the mechanism just described to run easily and smoothly, I prefer to provide ball-bearings for all of the various parts of the trains of mechanisms and especially for the hubs of the adding set where they are journaled on the shafts 57 and 63'.

For the purpose of operating suitable registering or recording wheels distances corresponding to the movements of the feed controllers or feed-cams 51 to 55, inclusive, I prefer to make use of a mechanism such as that shown clearly in Figs. 5 and 6. It consists, essentially, of registering or recording wheels and a transmitting mechanism interposed between them and the feed-cams for the purpose of retarding the registration of the weight and especially for the purpose of retarding such registration until the transmitting mechanism is unlocked or released and permitted to come into operative relation with the feed-cams. This transmitting mechanism preferably consists of a plurality of feed-transmitters, which, as here shown, are lever-arms 101, 102, 103, 104, and 105, having gear-segments, such as 112, secured thereto and meshing with pinions, such as 122, secured, respectively, to a series of five registering or recording wheels, which may be of the type illustrated at 131, 132, 133, 134, and 135. At the end thereof which coöperates with the feed-controller or feed-cam each feed transmitter or lever has a face adapted to coact with the steps 60 of the feed-cam, this face being preferably formed by a squared pin, such as 142, projecting from the side of its respective lever. This pin normally clears the index-cam, the clearance being twice the drop between the steps of the cam-face, and all of said feed transmitters or levers may be held in their normal positions by a common locking device, such as the universal bar 150, which is formed as a rocking bail having its pivot at 151 in the main side frames of the framework 50, said bail being held in the position shown in Figs. 5 and 6 until it is released by the operation of a proper controlling-handle or other element for guarding the operation of the registering mechanism. The feed-transmitters will not be released until the load is on the machine and the feed-controllers are in position to indicate the weight and the extent of the movement to be imparted to each of the registering or recording wheels 131 to 135, inclusive. As soon as these feed-transmitters are released, however, by the universal bar or bail 150 they will be actuated toward the shafts 63 and 63' and will be stopped by the engagement of their pins, such as 142, against those stops of the respective cams which are in the path of travel of said pins. This movement of each of the feed-transmitters may be effected by means of expansion-springs, such as 155, which in this construction connect the levers 102, &c., with corresponding locating or locking devices, such as 162, for locating and locking the various wheels, such as 132, in proper alinement for recording. These locating or locking devices, as here shown, are in the form of hooked angle-levers, the hooks of which coact with tooth-spaces, such as 132', in the inner sides of the rims of the wheels 132, &c., and lock said wheels at the recording moment. The lower ends of the angle-levers 162 are connected by the expansion-springs 155 to the feed-transmitters, these springs normally holding said locking devices out of action and also serving to actuate the feed-transmitters 102 when the latter are released by the universal bar 150. By referring to Fig. 5 it will be seen that this universal bar when it releases said feed-transmitters is swung upward and positively actuates the hooked angle-levers 162, &c., and forces the same into engagement with the tooth-spaces, such as 132', in opposition to the pull of the springs 155. The locking of the wheels 132, &c., in position of course takes place after the wheels have been fully actuated to their proper weight-recording positions.

The operation of the parts just described may be controlled in any desired manner—in this case by means of a controlling-lever, (designated generally by 170,) the handle of which is preferably inclosed in a locked casing, such as 171, a key to which will usually be held by each of the truckmen or other persons using the machine. The main axis of this lever is indicated at 172, and the lever itself is normally held in the position shown in Fig. 5 by means of a spring 173. Between its axis and the handle this lever may be connected with the universal bar 150 for the purpose of operating the same to release the feed-transmitters. The connections here shown comprise a short connecting-rod 175, pivoted at its lower end to the lever 176, which is pivoted in turn at its center at a suitable point on the frame 50 and at its other end is connected, by means of a link 177, to the free end of a short rock-arm 178, movable in unison with the rocking bail constituting the universal bar 150. When the handle of the lever 170 is depressed, the universal bar 150 will be swung up, the feed-controllers released and brought into engagement with the proper stops of the feed-cams, and the recording-wheels locked in their recording positions. The lever 170 also controls in this construction the recording of the weight of each individual load and the sum of the weights of all the loads on a strip of paper, suitable inking means, preferably an ink-ribbon, coöperating with these elements. These associated devices are best shown in Figs. 5, 6, and 7. 180 designates a roll of paper carried by a suitable reel 181, supported by a spindle 182, which may be mounted in open-sided bearings in the frame-pieces 183 and 184, as shown in Fig. 7. The paper strip may be fed toward the handle of the lever 170 by a pair of rolls, one of which is indicated at 185 and is mounted on the axis 172 of the lever 170 and the other of which is shown at 186 and is spring-pressed upward in a well-known manner. The feed-roll 185 has a ratchet-wheel 187 movable therewith, and each time the handle of the lever 170 is depressed a spring-pressed feed-pawl 188 on said lever indicates a ratchet-feed of one or more teeth, as desired. On the return of the handle to its original position by the spring 173 the feed, previously indicated, is accomplished, and the paper strip $p$ is fed toward the handle the desired distance. An auxiliary feed device is also provided for feeding an additional length of paper, this auxiliary device comprising a feed-spindle 190, having a milled head 191 for turning the same and carrying at its opposite end a bevel-gear 192, which meshes with a bevel-gear 193, secured to the same shaft 172, as the feed-roll 185. The strip of paper $p$ is fed in this case under a pair of guides 195, which locate the strip in its proper position. The lever 170 is also employed in this construction as a means for coacting with the position-recording wheels 132, &c., to produce an impression and record the weight on the paper strip $p$. The complementary element of the impression-producing means is in this case an impression-bar 200, fixed to the body of the lever 170. This impression-bar has a flat face spanning all five recording-wheels 131 to 135, inclusive, and of greater width than the height of the types on said wheels. When brought down onto the paper at the point of contact with the recording-wheels, the desired impression, showing the weight of the individual load and the total of all loads weighed, will be produced.

I prefer to provide means for inking the types of the wheels 131 to 135, inclusive, and for producing a printed impression on the paper strip $p$. The inking means employed is a ribbon $r$, which, as shown, is fed from a reel 210 over a pair of supporting guide-rolls 211 and 212 and is wound upon a second reel 213, all of these parts being carried by brackets 215 and 216, and the reel 213 having a ratchet-wheel 217 for imparting the necessary feed movement to the ribbon. This ratchet-wheel is actuated by a pawl 218, carried by a lever-arm 219, the free end of which is connected to the lever 170 by means of a short rod or link 220. Each operation of the handle therefore serves not only to feed the paper, but also to feed the ribbon.

After the weight has been recorded or printed on the paper strip $p$ by the devices just described a strip of suitable length to form a printed ticket may be severed from the continuous strip of paper. This may be accomplished by means of a knife 221, mounted to slide up and down on the frame-piece 222 and operated by a projecting lug 223 of the lever 170. This knife-actuating lug may be so arranged as to operate the knife 221 when the handle of the lever 170 is depressed or move downward with said lever without operating the knife. In order to permit this, the lever 170 is made in two parts, the forward end 170' of which is movable in a substantially horizontal plane relatively to the main portion of the lever, while the lever as a whole works in a vertical plane. This substantially horizontal movement of the handle of the lever permits the lug 223 to be shifted into or out of operative relation with the knife, so as to sever the strip or leave it uncut, as may be desired.

The lever 170 in the construction shown also constitutes the main controlling element of the locking and releasing means hereinbefore referred to for governing the operation of the adding set of the recording mechanism. In this case the clutch mechanism for coupling the individual and adding sets of the recording mechanism and for uncoupling the same is not controlled directly by the lever itself, but indirectly through other connecting elements. In the type of weighing machine shown, which is adapted more particularly for weighing trucks which pass onto the load receiver or platform at one side of the scale and off at the other, I prefer to provide means controlled by the truck itself for preventing exit of the same until the weight of the load carried by the truck has been properly registered or recorded. In Fig. 10 these controlling devices are illustrated in detail. As the truck passes onto the platform of the scale it operates one or more controlling devices, these devices being load-actuated stops or locking devices, one of which is shown at 230 and constitutes a stop coöperative with a similar stop or locking device 231 for preventing operation of the registering mechanism until the handle 170 is operated, and the other is a stop or locking device, such as 235, for preventing the vehicle containing the load from being driven off before the weight of its load has been registered. The truck-controlling device or stop-bar 235 is complementary to a truck-controlled bar or treadle 234 and operates in opposition thereto. These two parts are preferably strong frames mounted to slide up and down in guideways 236 and 237 in suitable supporting-guides 238 and 239 and are connected by longitudinal bars or rods 240, the ends of which are connected with the vertical members 234' and 235' of the treadles 234 and 235 by means of angle-levers 241 and 242, having their leverages so adjusted that the treadle 235 will have twice the movement of the treadle 234. The normal positions of these parts are shown in full lines, and the positions of said parts when a load is on the scale is indicated by dotted lines, the stop or treadle 235 being projected up into the path of the load to prevent exit thereof until its weight is registered. Near the center thereof the rear bar 240 is connected to the upper free end of an arm 250, secured to a rock-shaft 251, journaled in bearings rising from the bottom of the scale-base, the rear end of this rock-shaft carrying the rock-arm or locking-stop 230, hereinbefore mentioned. The coacting stop or interlocking device 231 is also pivoted adjacent to the stop 230 and is counterweighed, as indicated at 231'. Connecting-rods 260 and 261 are pivoted at their lower ends to these two coacting stops or locking devices, and at their upper ends lead, respectively, to the clutch mechanism before described and to the lever 170.

As shown in Fig. 6, the adding mechanism is normally held stationary. In the construction shown in Figs. 6 and 8 the shiftable clutch element 82, which has at each end thereof only a single tooth for coacting with the movable clutch-gear 77 or the fixed clutch-gear 85, is pinned to a shifting rod 265 and has a pin-and-slot connection 266 with the shaft 63'. This shifting rod is controlled by a shifting lever 267, pivoted on a bracket 268 and normally operable by the spring 269 to clutch the element 82 to the movable gear 77. This shifting lever is normally held, however, in the position shown in Fig. 6 by a strong spring 270, surrounding a connecting-rod 271, pivoted to the upper end of the lever 176 and put under compression when the handle of the lever 170 is depressed, this movement of said lever serving to move the shifting lever 267 to the position shown in Fig. 6 in opposition to the thrust of the spring 269. When the lever 170 is released, however, the thrust of the spring 270 is withdrawn and the spring 269 becomes effective to operate the shifting lever 267. The lower end of the shifting lever is normally latched in the position shown by means of a spring-pressed detent 272, this detent being a swinging one and having thereon a pin 272', normally engaged by a releasing-hook 273 at the upper end of the rod 260.

The parts being normally in the positions shown, it will be seen that when a vehicle goes onto the platform 4 the treadle 234 will be immediately depressed, the treadle 235 raised to prevent exit of the vehicle, the locking-stop 230 raised, and said stop locked in its raised position by the coacting locking-stop 231, which is shifted to the left in Fig. 10 by its counterweight. As the locking-stop 230 rises the connecting-rod 260 descends and the releasing device 273 trips the detent 272, releases the shifting lever 267, and permits the spring 269 to actuate said lever to clutch the element 82 to the gear 77, and thereby couple the adding set to the individual set during the weight-registering movement of said individual set. The door 171 will then be unlocked and the handle of the lever 170 operated, thus raising the connecting-rod 261, releasing the locking-stop 231 from its coacting stop 230, and permitting the treadle 235 to fall and the treadle 234 to rise again, the tripping device 273 being simultaneously raised and hooked over the pin 272'. The return movements of the treadles of this tripping or releasing hook 273 are due to the fact that the treadle 235 is considerably heavier than that shown at 234 and normally tends to return the parts to the position shown in full lines in Fig. 10. At the same time that the handle of the lever 170 is depressed the spring 270 is put under tension and the shifting lever 267 moved back to its original position (shown in Fig. 6) and latched by the detent 272, with the adding set disconnected from the individual set and locked to the frame again. The other operations controlled by the lever 170 take place, as before stated, the actual printing of the record being effected when the lever is in its lowermost position. Tension will of course be taken off the spring 270 when the lever 170 rises.

At 280 I have shown counterweights attached to the frames of the scale-beams 9 and 10 for the purpose of adjusting the poise of the weighing mechanism, these adjustable weights being constructed and operated in a well-known manner. In connection with the main weighing mechanism I may make use of suitable counterpoising or counterbalancing means representative of the weight of the truck or other vehicle which contains the load. This counterbalancing means will of course oppose the weight of the load carried by the receiver, and when it corresponds exactly to the weight of such vehicle or truck it will obviously constitute an automatic tare counterpoise or counterbalance which will automatically deduct from the gross load weighed the weight of the truck or vehicle and cause only the net weight of the load to be registered or recorded by the machine. This tare counterpoise or counterbalance may be a weight located at any suitable point in the weighing mechanism; but I prefer to provide an auxiliary tare counterpoise or counterbalance in the form of a scale-beam, such as 300, pivoted within the hollow column 3 and protected by a normally locked door 302, (which, however, is shown open in Fig. 4.) This auxiliary scale-beam is connected by a link 303 with a lever 304, the free end of the long arm of which is connected by a long rod 305 to the main connecting-rod 40, which operates the rack 41. The movements and leverages of these parts are properly adjusted with respect to the vertical movement of the rod 40, and the gross weight tending to lower the rod 40 is opposed by the weight of the tare-counterpoise or scale-beam 300 301, the power of which is exerted upwardly on said rod 40. The weight 301 is adjustable along the arm 300, so as to permit the tare-counterpoise to be set to represent any desired amount corresponding to the weight of the vehicle, the vehicles used to contain the loads being all preferably of uniform weight.

Locked doors—such as 310, 311, and 312—may be provided in addition to those before described for the purpose of permitting access to the various operative parts of the machine, while preventing tampering with the mechanism. The front of the indicator is also provided with the usual glass cover-plate for observing the movements of the indicators 70 and 71.

What I claim is—

1. In an automatic weighing-machine, the combination with a load-receiver movable different distances corresponding to the loads weighed, and with means for resisting the force of the load, of a weight-registering mechanism embodying motor-operated means for effecting weight-registering movements corresponding to the varying movements of the load-receiver and also embodying manually-releasable means for normally holding said motor-operated means out of action, and means operated by the load-receiver for limiting the movements of said motor-operated means.

2. In an automatic weighing-machine, the combination with a load-receiver movable different distances corresponding to the loads weighed, and with means for resisting the force of the load, of a weight-recording mechanism embodying motor-operated means for effecting weight-recording movements corresponding to the varying movements of the load-receiver, and also embodying manually-releasable means for normally holding said motor-operated means out of action, and means operated by the load-receiver for limiting the movements of said motor-operated means.

3. In an automatic weighing-machine, the combination with a load-receiver movable different distances corresponding to the loads weighed, and with means for resisting the force of the load, of a weight-registering adding mechanism embodying motor-operated means for effecting weight-registering movements corresponding to the varying movements of the load-receiver and also embodying manually-releasable means for normally holding said automatic means out of action, and means operated by the load-receiver for limiting the movements of said motor-operated means.

4. In an automatic weighing-machine, the combination with a load-receiver movable different distances corresponding to the loads weighed, and with means for resisting the force of the load, of a weight-recording adding mechanism embodying motor-operated means for effecting weight-recording movements corresponding to the varying movements of the load-receiver and also embodying manually-releasable means for normally holding said motor-operated means out of action, and means operated by the load-receiver for limiting the movements of said motor-operated means.

5. In an automatic weighing-machine, the combination with a load-receiving platform mounted on scale-beams and movable different distances corresponding to the loads weighed, and with means for resisting the force of the load, of a weight-registering adding mechanism embodying motor-operated means for effecting weight-registering movements corresponding to the varying movements of the load-receiving platform and also embodying manually-releasable means for normally holding said motor-operated means out of action, and means operated by the load-receiver for limiting the movements of said motor-operated means.

6. In an automatic weighing-machine, the combination with a load-receiver movable different distances corresponding to the loads weighed, and with means for resisting the force of the load, of a weight-registering mechanism embodying motor-operated means for effecting weight-registering movements corresponding to the varying movements of the load-receiver and also embodying manually-releasable means for normally holding said motor-operated means out of action, and variably-movable controlling means connected with the load-receiver for limiting the movements of said motor-operated means.

7. In an automatic weighing-machine, the combination with a load-receiver movable different distances corresponding to the loads weighed, and with means for resisting the force of the load, of a weight-registering mechanism embodying motor-operated means for effecting weight-registering movements corresponding to the varying movements of the load-receiver and also embodying manually-releasable means for normally holding said motor-operated means out of action, and a variably-movable feed-controller operated by the load-receiver and having feed-indicating elements corresponding in value to different movements of said feed-controller and coöperative with said motor-operated means for limiting the movements thereof.

8. In an automatic weighing-machine, the combination with a load-receiver movable different distances corresponding to the loads weighed, and with means for resisting the force of the load, of a weight-registering mechanism embodying motor-operated means for effecting weight-registering movements corresponding to the varying movements of the load-receiver and also embodying manually-releasable means for normally holding said motor-operated means out of action, and a variably-rotatable primary feed-cam operated by the load-receiver and mounted to rotate freely any distance up to a predetermined plurality of rotations and having feed-indicating elements corresponding in value to the different fractional parts of a single rotation and coöperative with different elements of said motor-operated means for transmitting to one of said elements the rotary movements of the feed-cam and to the other of said elements the movements represented by said feed-indicating elements.

9. In an automatic weighing-machine, the combination with a load-receiver movable different distances corresponding to the loads weighed, and with means for resisting the force of the load, of a weight-registering mechanism, and a variably-rotatable feed-cam governed by the load-receiver and having a stepped cam-face indicating feeds corresponding in value to its rotary movements and governing said weight-registering mechanism.

10. In an automatic weighing-machine, the combination with a load-receiver movable different distances corresponding to the loads weighed, and with means for resisting the force of the load, of a weight-registering mechanism, a variably-movable feed-controller having feed indications corresponding in value to its movements, means coacting with the load-receiver for governing said feed-controller, and a feed-transmitter governed by said feed-controller but opposing no resistance to the weight-indicating movements thereof and in direct mechanical connection with said weight-registering mechanism.

11. In an automatic weighing-machine, the combination with a load-receiver movable different distances corresponding to the loads weighed, and with means for resisting the force of the load, of a variably-movable feed-controller governed by the load-receiver and having feed-indicating members corresponding in value to its movements, a weight-registering mechanism governed by the movements of the feed-controller, and means controlled by said feed-indicating members and operative independently of the movements of said controller for locating said weight-registering mechanism.

12. In an automatic weighing-machine, the combination with a load-receiver movable different distances corresponding to the loads weighed, and with means for resisting the force of the load, of a variably-movable feed-cam governed by the load-receiver and having a stepped cam-face indicating feeds corresponding in value to its variable movements, a weight-registering mechanism governed by the movements of said feed-cam, and means controlled by said cam-face for locking said weight-registering mechanism in a registering position.

13. In an automatic weighing-machine, the combination with a load-receiver movable different distances corresponding to the loads weighed, and with means for resisting the force of the load, of a variably-rotatable feed-cam governed by the load-receiver and having a stepped cam-face indicating feeds corresponding in value to its variable rotary movements, a weight-registering mechanism governed by the movements of said feed-cam, and means controlled by said cam-face for locking said weight-registering mechanism in a weight-registering position.

14. In an automatic weighing-machine, the combination with a load-receiver movable different distances corrresponding to the loads weighed, and with means for resisting the force of the load, of a variably-rotatable feed-cam governed by the load-receiver and having a stepped cam-face indicating feeds corresponding in value to its variable rotary movements, and weight-recording mechanism governed by the movements of said feed-cam and having recording numbers corresponding to and located in position by the steps of said cam.

15. In an automatic weighing-machine, the combination with a load-receiver movable different distances corresponding to the loads weighed, and with means for resisting the force of the load, of a variably-rotatable feed-cam governed by the load-receiver and having a stepped cam-face indicating feeds corresponding in value to its variable rotary movements, weight-recording mechanism, and a feed-transmitter governed by said feed-cam and coöperative with the stepped faces thereof for operating the weight-recording mechanism to and locating it in a recording position.

16. In an automatic weighing-machine, the combination with a load-receiver movable different distances corresponding to the loads weighed, and with means for resisting the force of the load, of a variably-rotatable feed-cam governed by the load-receiver and having a stepped cam-face indicating feeds corresponding in value to its variable rotary movements, a feed-transmitter normally out of operative relation with said feed-cam and movable into operative relation therewith after the stoppage of the cam and governed in its movements by the steps of the cam-face, and a weight-registering mechanism governed by said feed-transmitter.

17. In an automatic weighing-machine, the combination with a load-receiver movable different distances corresponding to the loads weighed, and with means for resisting the force of the load, of a feed-controller governed by the load-receiver and rotatable different distances the maximum of which comprises a plurality of rotations and all of which correspond to the movements of the load-receiver, and registering adding mechanism governed by said feed-controller and embodying a train of registering elements having working and return strokes and constituting an individual set and also embodying another train of registering elements normally having working strokes only and constituting an adding set.

18. In an automatic weighing-machine, the combination with a load-receiver movable different distances corresponding to the loads weighed, and with means for resisting the force of the load, of a feed-controller governed by the load-receiver and rotatable different distances the maximum of which comprises a plurality of rotations and all of which correspond to the movements of the load-receiver, and recording adding mechanism governed by said feed-controller and embodying a train of recording elements having working and return strokes and constituting an individual set and also embodying another train of recording elements normally having working strokes only and constituting an adding set.

19. In an automatic weighing-machine, the combination with a load-receiver movable different distances corresponding to the loads weighed, and with means for resisting the force of the load, of a feed-cam governed by the load-receiver and rotatable different distances the maximum of which comprises a plurality of rotations and all of which correspond to the movements of the load-receiver, and registering adding mechanism governed by said feed-cam.

20. In an automatic weighing-machine, the combination with a load-receiver movable different distances corresponding to the loads weighed, and with means for resisting the force of the load, of a feed-controller governed by the load-receiver and rotatable different distances the maximum of which comprises a plurality of rotations and all of which correspond to the movements of the load-receiver, registering adding mechanism governed by said feed-controller and embodying a train of registering elements having working and return strokes and constituting an individual set and also embodying another train of registering elements normally having working strokes only and constituting an adding set, and means for locating the registering mechanism in a registering position.

21. In an automatic weighing-machine, the combination with a load-receiver movable different distances corresponding to the loads weighed, and with means for resisting the force of the load, of a stepped feed-cam governed by the load-receiver and rotatable different distances the maximum of which comprises a plurality of rotations and all of which correspond to the movements of the load-receiver, registering adding mechanism governed by said feed-controller, and means controlled by the stepped faces of said cam for locating the registering mechanism in a registering position.

22. In an automatic weighing-machine, the combination with a load-receiver movable different distances corresponding to the loads weighed, and with means for resisting the force of the load, of a weight-registering adding mechanism embodying a train of registering-wheels freely rotatable in both directions and constituting an individual set and also embodying another train of registering-wheels normally rotatable in one direction only and constituting an adding set, said mechanism having weight-registering movements corresponding to and controlled by the movements of the load-receiver and said registering-wheels each containing a plurality of series of figures of different denominations.

23. In an automatic weighing-machine, the combination with a load-receiver movable different distances corresponding to the loads weighed, and with means for resisting the force of the load, of a weight-recording adding mechanism embodying a train of recording-wheels freely rotatable in both directions and constituting an individual set and also embodying another train of recording-wheels normally rotatable in one direction only and constituting an adding set, said mechanism having weight-recording movements corresponding to and controlled by the movements of the load-receiver and said recording-wheels each containing a plurality of series of figures of different denominations, and paper-feeding and impression-producing means coacting with said recording-wheels.

24. In an automatic weighing-machine, the combination with a load-receiving platform mounted on scale-beams and movable different distances corresponding to the loads weighed, and with means for resisting the force of the load, of a weight-registering adding mechanism comprising two registering devices one of which is controlled both by the ascending and the descending movements of the load-receiving platform and the other of which is controlled only by the descending movements of said load-receiving platform, and means for removing the resistance of said devices from the weighing mechanism during the weighing of a load.

25. In an automatic weighing-machine, the combination with a load-receiving platform mounted on scale-beams and movable different distances corresponding to the loads weighed, and with means for resisting the force of the load, of a weight-recording adding mechanism comprising two recording devices one of which is controlled both by the ascending and the descending movements of the load-receiving platform and records the individual loads and the other of which is controlled only by the descending movements of the load-receiving platform and records the totals of successive loads, and means for removing the resistance of said devices from the weighing mechanism during the weighing of a load.

26. In an automatic weighing-machine, the combination with a load-receiver movable different distances corresponding to the loads weighed, and with means for resisting the force of the load, of a weight-recording adding mechanism comprising two recording devices one of which is controlled by the ascending and descending movements of the load-receiver and records only the individual loads and the other of which is controlled only by the descending movements of said load-receiver and records the totals of successive loads, and paper-feeding and impression-producing means coacting with both of said recording devices.

27. In an automatic weighing-machine, the combination with a load-receiver movable different distances corresponding to the loads weighed, and with means for resisting the force of the load, of a weight-recording adding mechanism comprising two recording devices one of which is controlled by the ascending and descending movements of the load-receiver and records only the individual loads and the other of which is controlled only by the descending movements of said load-receiver and records the totals of successive loads, and inking paper-feeding and impression-producing means coacting with both of said recording devices.

28. In an automatic weighing-machine, the combination with a load-receiving platform mounted on scale-beams and movable different distances corresponding to the loads weighed, and with means for resisting the force of the load, of a weight-recording adding mechanism comprising two sets of recording-wheels one of which sets is controlled both by the ascending and the descending movements of the load-receiving platform and records only the individual loads and the other of which is controlled only by the descending movements of said load-receiving platform and records the totals, of successive loads, and means for removing the resistance of said wheels from the weighing mechanism during the weighing of a load.

29. In an automatic weighing-machine, the combination with a load-receiving platform movable different distances corresponding to the loads weighed, and with means for resisting the force of the load, of a weight-recording adding mechanism comprising two sets of recording-wheels one of which sets is controlled both by the ascending and the descending movements of the load-receiving platform and records only individual loads and the other of which sets is controlled only by the descending movements of the load-receiving platform and records the totals of successive loads each of said wheels having figures of different denominations for recording loads of maximum weight with a minimum number of wheels, and means for removing the resistance of said wheels from the weighing mechanism during the weighing of a load.

30. In an automatic weighing-machine, the combination with a load-receiving platform mounted on scale-beams and movable different distances corresponding to the loads weighed, and with means for resisting the force of the load, of a weight-registering adding mechanism comprising two sets of registering-wheels one of which is an individual set and the other an adding set, means for removing the resistance of said wheels from the weighing mechanism during the weighing of a load, and means for coupling said sets during the registration of a load and for holding said adding set during the return movement of the individual set.

31. In an automatic weighing-machine, the combination with a load-receiving platform movable different distances corresponding to the loads weighed, and with means for resisting the force of the load, of a weight-registering adding mechanism comprising two sets of registering-wheels one of which is an individual set and the other an adding set each wheel of each set having thereon figures of different denominations for recording loads of maximum weight with a minimum number of wheels, means for removing the resistance of said wheels from the weighing mechanism during the weighing of a load, and means for coupling said sets during the registration of a load and for holding said adding set during the return movement of the individual set.

32. In an automatic weighing-machine, the combination with a load-receiving platform mounted on scale-beams and movable different distances corresponding to the loads weighed, and with means for resisting the force of the load, of a weight-registering adding mechanism comprising two sets of registering-wheels one of which is an individual set and the other an adding set, means for removing the resistance of said wheels from the weighing mechanism during the weighing of a load, and means for coupling said sets during the registration of a load and for coupling said adding set to a fixed element during the return movement of the individual set.

33. In an automatic weighing-machine, the combination with a load-receiver movable different distances corresponding to the loads weighed, and with means for resisting the force of the load, of a weight-registering adding mechanism comprising two sets of registering-wheels one of which is an individual set and the other an adding set, a coupling member movable in unison with the individual set, a fixed coupling member, and a third coupling member carried by the adding set and movable into and out of engagement with said first two coupling members alternately.

34. In an automatic weighing-machine, the combination with a load-receiver movable different distances corresponding to the loads weighed, and with means for resisting the force of the load, of a weight-registering adding mechanism comprising two sets of registering-wheels one of which is an individual set and the other an adding set, clutch devices for coupling said sets during the registration of a load and for holding said adding set during the return movement of the individual set, and clutch-operating means.

35. In an automatic weighing-machine, the combination with a load-receiver movable different distances corresponding to the loads weighed, and with means for resisting the force of the load, of a weight-registering adding mechanism comprising two sets of registering-wheels one of which is an individual set and the other an adding set, clutch devices for coupling said sets during the registration of a load and for holding said adding set during the return movement of the individual set, clutch-operating means, and means for locking and releasing said clutch-operating means.

36. In an automatic weighing-machine, the combination with a load-receiver movable different distances corresponding to the loads weighed, and with means for resisting the force of the load, of a weight-registering adding mechanism comprising two sets of registering-wheels one of which is an individual set and the other an adding set, clutch devices for coupling said sets during the registration of a load and for holding said adding set during the return movement of the individual set, a clutch-operating handle, and means for locking and releasing said handle.

37. In an automatic weighing-machine, the combination with a load-receiver movable different distances corresponding to the loads weighed, and with means for resisting the force of the load, of a weight-registering adding mechanism comprising two sets of registering-wheels one of which is an individual set and the other an adding set, clutch devices for coupling said sets during the registration of a load and for holding said adding set during the return movement of the individual set, and clutch-operating means mounted in a normally locked casing.

38. In an automatic weighing-machine, the combination with a load-receiver movable different distances corresponding to the loads weighed, and with means for resisting the force of the load, of a weight-registering mechanism having weight-registering movements corresponding to the movements of the load-receiver, a locking device for preventing premature removal of the load, and a load-operated treadle for operating said device.

39. In an automatic weighing-machine, the combination with a load-receiver movable different distances corresponding to the loads weighed, and with means for resisting the force of the load, of a weight-registering mechanism having weight-registering movements corresponding to the movements of the load-receiver, a locking device adapted to prevent removal of the load until its weight is registered, a load-operated treadle for operating said device, and means for releasing said locking device on the registration of the load.

40. In an automatic weighing-machine, the combination with a load-receiving platform, of a weight-registering mechanism, operating means between said platform and weight-registering mechanism for actuating the latter, a stop-operating treadle actuated by a vehicle coming onto said platform, and means including a treadle for preventing premature exit of said vehicle.

41. In an automatic weighing-machine, the combination with a load-receiving platform, of weight-registering mechanism, operating means between said platform and weight-registering mechanism for actuating the latter, a stop for preventing premature exit of said vehicle, and a treadle, actuated by a vehicle coming onto said platform, for operating said stop.

42. In an automatic weighing-machine, the combination with a load-receiving platform, of weight-registering mechanism, operating means between said platform and weight-registering mechanism for actuating the latter, a normally raised treadle operable by a vehicle going onto one side of said platform, and a normally depressed vehicle-stop at the exit side of said platform and connected with said treadle for movement in opposition thereto.

43. In an automatic weighing-machine, the combination with a load-receiving platform, of a weight-registering mechanism, operating means between said platform and weight-registering mechanism for actuating the latter, a locking device operable by a vehicle going onto said platform and adapted to prevent exit of the vehicle until its load is registered, and means for releasing said locking device on the registration of the load.

44. In an automatic weighing-machine, the combination with a load-receiving platform, of a weight-registering mechanism, operating means between said platform and weight-registering mechanism for actuating the latter, a locking device operable by a vehicle going onto said platform and adapted to prevent premature exit of said vehicle, and normally locked means for operating said registering mechanism and releasing said locking device.

45. In an automatic weighing-machine, the combination with a load-receiving platform, of a weight-registering mechanism, operating means between said platform and weight-registering mechanism for actuating the latter, a locking device operable by a vehicle going onto said platform and adapted to prevent premature exit of said vehicle, and a normally locked controlling element governing the operation of said recording mechanism and the release of said locking device.

46. In an automatic weighing-machine, the combination with a load-receiver, of a weight-registering adding mechanism embodying a train of registering elements having working and return strokes and constituting an individual set and also embodying another train of registering elements normally having working strokes only and constituting an adding set, a load-operated locking device for preventing the operation of said adding set, and a controlling element for releasing said locking device.

47. In an automatic weighing-machine, the combination with a load-receiver, of a weight-recording adding mechanism embodying a train of recording elements having working and return strokes and constituting an individual set and also embodying another train of recording elements normally having working strokes only and constituting an adding set, a load-operated locking device for preventing the operation of said adding set, and a controlling element for releasing said locking device.

48. In an automatic weighing-machine, the combination with a load-receiver, of a weight-recording adding mechanism embodying a train of recording elements having working and return strokes and constituting an individual set and also embodying another train of recording elements normally having working strokes only and constituting an adding set, load-operated means for coupling said sets and locking the recording mechanism out of action, and a normally locked controlling element for first releasing said recording mechanism and then coupling said adding set and locking it out of action.

49. In an automatic weighing-machine, the combination with a load-receiver, of a weight-recording adding mechanism having individual and adding sets, a load-operated coupling device for coupling said sets, a load-operated locking device for preventing the operation of said recording mechanism, and a normally locked controlling element for first releasing said locking device and then uncoupling said adding set and locking it out of action.

50. In an automatic weighing-machine, the combination with a weighing mechanism embodying a platform movable different distances corresponding to the loads weighed and adapted to receive a vehicle and its load, and with means for resisting the force of the load, of a tare-counterpoise representing the weight of said vehicle and opposing a predetermined resistance to the weight of the load, a registering mechanism operable different distances corresponding to the difference between the forces exerted by the loaded weighing mechanism and the tare-counterpoise, and means for removing the resistance of said registering mechanism from the weighing mechanism during the weighing of a load.

51. In an automatic weighing-machine, the combination with a main weighing mechanism embodying a platform movable different distances corresponding to the loads weighed and adapted to receive a vehicle and its load, and with means for resisting the force of the load, of an auxiliary weighing mechanism constituting a tare-counterpoise opposing a predetermined resistance to the weight of the load, a registering mechanism operable different distances corresponding to the difference between the forces exerted by the loaded main weighing mechanism and the auxiliary weighing mechanism, and means for removing the resistance of said registering mechanism from the weighing mechanism during the weighing of a load.

52. In an automatic weighing-machine, the combination with a weighing mechanism embodying a load-receiving platform adapted to receive loaded vehicles and movable different distances corresponding to the loads weighed, and with means for resisting the force of the load, of a weight-registering mechanism having weight-registering movements corresponding to and controlled by the movements of the load-receiver, and a governor coacting with said weighing mechanism and embodying a cylinder and piston for regulating the movements thereof.

Signed at New York, in the county of New York and State of New York, this 31st day of July, A. D. 1903.

FREDERICK A. BOLAND.

Witnesses:
   C. S. CHAMPION,
   R. CHAMPION.